H. W. LUNCEFORD.
DOUBLE SEAT WATER GATE.
APPLICATION FILED MAR. 13, 1912.
1,056,563.
Patented Mar. 18, 1913.
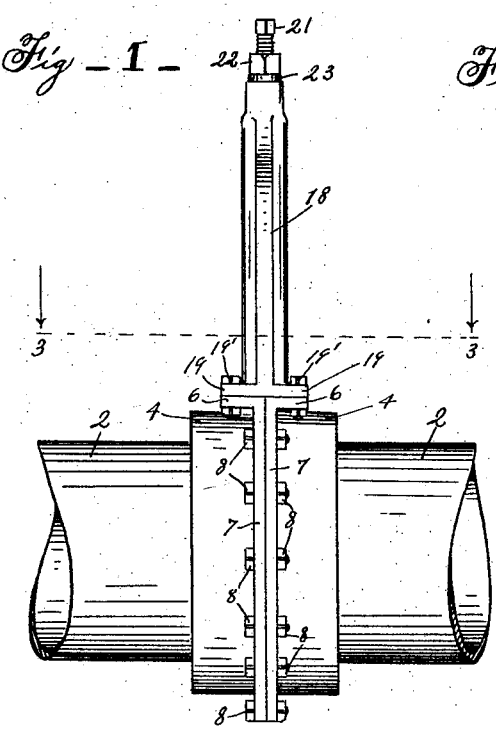
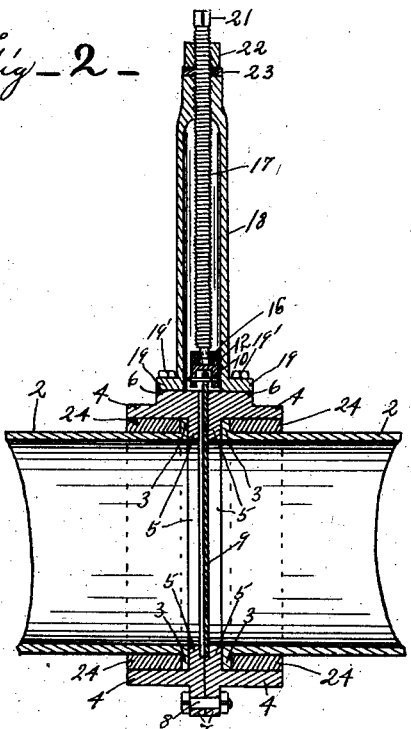
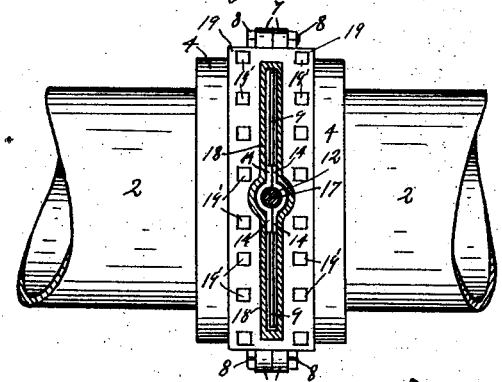
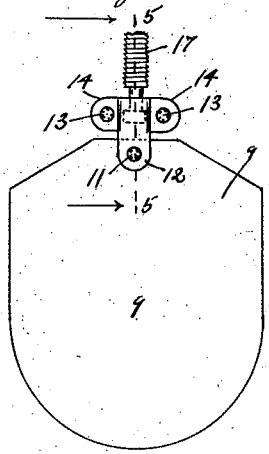
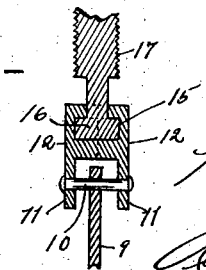
WITNESSES:
INVENTOR
Henry W. Lunceford
By
ATTORNEY.

UNITED STATES PATENT OFFICE.

HENRY W. LUNCEFORD, OF LOS ANGELES, CALIFORNIA.

DOUBLE-SEAT WATER-GATE.

1,056,563.  Specification of Letters Patent.  Patented Mar. 18, 1913.

Application filed March 13, 1912. Serial No. 683,629.

*To all whom it may concern:*

Be it known that I, HENRY W. LUNCEFORD, a citizen of the United States of America, residing at Los Angeles, in the county of Los Angeles, State of California, have invented a certain new and useful Double-Seat Water-Gate; and I do hereby declare the following to be a full, clear, and exact description of the invention, such as will enable others skilled in the art to which it appertains to make and use the same.

This invention relates to a double-seat water gate, and it may be said to consist in the provision of the novel features and in the novel and improved construction, arrangement and combination of the parts and members in the structure as will be apparent from the description and claims which follow.

One of the objects of the invention is to provide a construction whereby the gate is adapted to be forced, by pressure of a fluid, to one or to the other of two seats which are spaced from the gate when the latter is disposed centrally between them.

Further objects of the invention are to provide a structure of the nature specified which is simple in character, strong and durable in use, watertight, economical to install and maintain, effective in action, and in which the parts may be readily assembled or demounted.

Other objects and the advantages of the invention will be apparent to those skilled in the art from a consideration of the following description of the preferred form of the structure embodying the invention, taken in connection with the accompanying drawings in which, Figure 1 is a side elevational view of the structure in which the invention is applied; Fig. 2 is a central sectional view of the same; Fig. 3 is a view taken on the line 3—3 of Fig. 1; Fig. 4 is a detail of the gate and its connection with the screw, and Fig. 5 is a sectional view taken on the line 5—5 of Fig. 4.

The sections of pipe 2 may have on adjacent ends thereof the outwardly extending flanges 3. On the periphery of the flanges 3 may be fitted the annular collars 4 formed to provide the seats 5 facing the flanges 3, the flat surfaces 6 at the top thereof, and the outwardly extending flanges 7 joining the ends of the flat surfaces 6 and whereby the collars may be tightly secured together by means of bolts 8 passing through the flanges 7. The gate 9 is arranged in the space between the seats 5 and it is mounted to permit movement thereof longitudinally of the pipe sections 2 so that it will be forced to one or the other of the seats 5 depending on which face of the gate is exerted the pressure of fluid in the pipe sections 2.

As shown, the gate 9 is slidably mounted on a rod 10 which passes substantially centrally through the upper part of the gate 9 and has its end portions mounted in the depending flanges 11 of two similar parts 12 which may be secured together by bolts 13 passing through flanges 14 thereon. The parts 12 are formed to provide in the upper end portion thereof a socket 15 in which may be disposed, to have a turning movement, the enlarged portion 16 at the lower end of the screw 17. The upper end portion of the screw 17 may be threaded through the central portion of the upper part of the housing 18 which latter is disposed on the flat surfaces 6 and is provided with flanges 19 whereby it may be secured to the flat surfaces 6 by means of bolts 19. The upper end of the screw 17 may be formed with a suitable head 21 for the application of a wrench for turning the screw 17 to either raise or lower the gate 9; also a locknut 22 may be provided on the screw 17 and it may engage with a washer or gasket 23 on the upper end of the housing 18.

The spaces 24 between the annular collars 4 and the pipe sections 2 may be filled with lead, cement, or other suitable material to form a water-tight joint.

While one form of structure in which the invention may be embodied has been particularly illustrated and described, many changes and modifications thereof will readily occur to those skilled in the art, wherefore the right is reserved to all such changes and modifications as do not depart from the spirit and scope of the invention as defined in the appended claims.

I claim:

1. In a double seat valve gate, the combination of pipe sections, collars applied to the pipe sections and provided with inwardly extending annular flanges which abut against each other, the adjacent faces of the flanges being recessed to form spaced and opposed valve seats, means for securing the collars together, a slidably mounted gate received loosely within the recessed portion of the flanges and adapted to move laterally so as to be seated against either of the opposed valve seats, a gate operating member, and a loose connection between the gate operating member and the gate whereby the gate is permitted to have the necessary lateral play between the seats.

2. In a double seat gate, the combination of pipe sections, collars applied to the ends of the pipe sections and formed with inwardly projecting annular flanges which fit against each other, the adjacent faces of the flanges being recessed to provide spaced and opposed seats, a slidably mounted gate loosely received within the recessed portion of the flanges and adapted to be moved laterally so as to engage either of the opposed seats, means for connecting the collars, a housing applied to the collars, a socket within the housing, an adjusting rod swiveled to said socket for moving the same, and means adjustably connecting the gate and socket for permitting the necessary lateral play of the gate between the seats.

3. In a double seat gate, the combination of pipe sections, collars applied to the ends of the pipe sections and formed with inwardly projecting annular flanges which fit against each other, the adjacent faces of the flanges being recessed to provide spaced and opposed seats, and the said recessed portion opening through the collars at one side thereof, means for securing the collars together, a housing applied to the collars and communicating with the recessed portion of the flanges, a slidably mounted gate loosely received within the recessed portion of the flanges and adapted to engage either of the opposed seats, said gate having an opening in the edge thereof, a socket arranged within the housing and formed with a transverse pin which passes loosely through the opening of the gate to admit of the gate's moving laterally so as to engage either of the seats, and an adjusting rod mounted within the housing and having a swiveled connection with the socket.

In testimony whereof, I have signed my name to this specification in the presence of two subscribing witnesses at Los Angeles county of Los Angeles, State of California, this 29th day of February A. D. 1912.

HENRY W. LUNCEFORD.

Witnesses:
ANNA B. DESSAU,
A. H. LIDDERS.

Copies of this patent may be obtained for five cents each, by addressing the "Commissioner of Patents, Washington, D. C."